United States Patent
Trinkel et al.

(10) Patent No.: US 7,925,257 B2
(45) Date of Patent: Apr. 12, 2011

(54) METHOD FOR OPERATING A DATABASE

(75) Inventors: Marian Trinkel, Kreuzau Ot Untermaubach (DE); Christel Mueller, Schulzendorf (DE); Heiko Armin Schoenebeck, Berlin (DE); Carsten Weinman, Essen (DE); Dietmar Drees, Froendenberg (DE)

(73) Assignee: Deutsche Telekom AG, Bonn (DE)

( * ) Notice: Subject to any disclaimer, the term of this patent is extended or adjusted under 35 U.S.C. 154(b) by 1307 days.

(21) Appl. No.: 11/399,168

(22) Filed: Apr. 6, 2006

(65) Prior Publication Data

US 2007/0050324 A1 Mar. 1, 2007

(30) Foreign Application Priority Data

Apr. 7, 2005 (DE) .......................... 10 2005 016 815

(51) Int. Cl.
*H04W 4/00* (2009.01)
(52) U.S. Cl. ..................... 455/433; 455/424; 455/412.2; 455/466
(58) Field of Classification Search .................. 455/433, 455/424, 412.2, 466
See application file for complete search history.

(56) References Cited

U.S. PATENT DOCUMENTS

| 5,557,425 | A  | * | 9/1996  | Hasegawa ..................... 358/440 |
| 6,826,407 | B1 |   | 11/2004 | Helferich |
| 6,993,038 | B2 | * | 1/2006  | McCann ....................... 370/401 |
| 7,222,192 | B2 | * | 5/2007  | Allison et al. ................ 709/245 |
| 7,339,920 | B2 | * | 3/2008  | Skog et al. ................... 370/349 |
| 2002/0059251 | A1 | * | 5/2002 | Stern et al. ..................... 707/10 |
| 2002/0174185 | A1 |   | 11/2002 | Rawat et al. |
| 2005/0204381 | A1 | * | 9/2005 | Ludvig et al. ................. 725/34 |
| 2008/0052400 | A1 | * | 2/2008 | Ekberg .......................... 709/227 |

FOREIGN PATENT DOCUMENTS

| DE | 19734927 | 2/1999 |
| DE | 19935941 | 2/2001 |
| DE | 10105206 | 8/2002 |
| DE | 202004009719 | 9/2004 |
| EP | 1349090 | 10/2003 |
| GB | 2380096 | 3/2003 |
| WO | WO-0045577 | 8/2000 |

* cited by examiner

*Primary Examiner* — Nghi H Ly
(74) *Attorney, Agent, or Firm* — Leydig, Voit & Mayer, Ltd.

(57) ABSTRACT

A method for operating a database containing personal information includes checking the content of a message sent via a telecommunication network for the presence of personal information. If personal information is found, then the personal information is extracted from the message, the extracted information is associated with at least one person, and the extracted information is stored in a database.

35 Claims, 1 Drawing Sheet

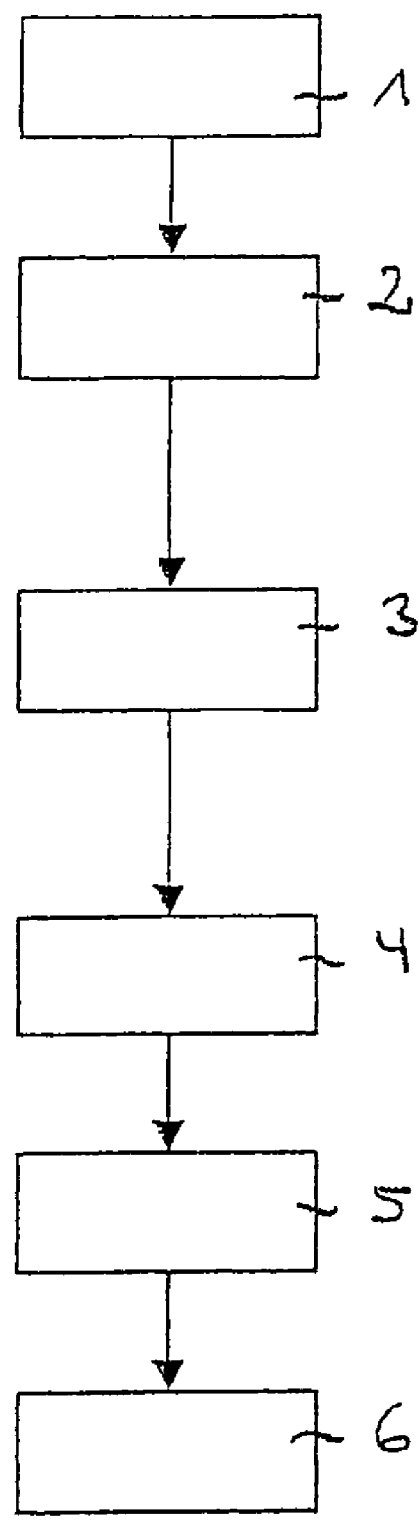
Figure

METHOD FOR OPERATING A DATABASE

Priority is claimed to German patent application DE 10 2005 016 815.9, filed Apr. 7, 2005, the entire subject matter of which is hereby incorporated by reference herein.

The invention relates to a method for operating, especially for generating and/or updating, a database containing personal information such as, for instance, an address database and/or an appointment database.

BACKGROUND

Databases containing personal information are acquiring ever-greater significance, both in the private and business realms. Thus, for example, it is known that companies access address databases and then send their advertising to persons stored in these databases in order to acquire new customers in this manner. Consequently, owing to the financial significance of such databases, it has now become common practice to buy and sell the contents of such databases, so as to also make the stored personal information available to other companies in exchange for payment. In this context, the value of such a database or of its contents depends to a decisive extent on the scope of the stored personal information and on how up-to-date this information is.

It is known nowadays that such databases or their contents are compiled essentially manually. To this end, potential customers are requested, for instance, through the modality of sweepstakes, to provide their addresses and other items of personal information. By the same token, information can be accessed that is typically available at mail-order companies, provided that the customers stored there have not explicitly prohibited their data from being passed on to others.

In addition to the above-mentioned databases essentially containing information about potential customers or recipients of advertising, another typical area of application for databases containing personal information is, for example, an address database and/or an appointment database. Nowadays, many people keep databases of the above-mentioned type for their business activities and sometimes also for their private sphere listing the contacts these persons use such as, for instance, business partners, friends, physicians, attorneys, public addresses, etc.

Also in the case of the latter databases, the problem of keeping the databases updated arises, for instance, when persons whose information is stored in such a database have moved elsewhere, thus changing their addresses, or else the person has contact data that has changed in the meantime for other reasons such as changed phone numbers, e-mail addresses, mailing addresses and the like.

SUMMARY OF THE INVENTION

It is an object of the present invention to provide a simple method with which, for example, the above-mentioned databases can be operated, especially generated and maintained.

According to the present invention, in that the content of a message sent via a telecommunication network—especially a voice, text and image message, a video message or a message in a website—is checked for the presence of personal information, and in that, once personal information has been found, it is extracted from a message, associated with at least one person and then stored in the database.

This above-mentioned invention is based on the fact that telecommunication networks are often employed nowadays to send all kinds of messages in order to transmit personal information. This personal information encompasses, for instance, name information, address information and contact information. Examples of telecommunication networks are the landline phone system, the cellular network, the Internet as well as any other type of network through which messages can be exchanged.

Thus, for instance, the telephone system is a preferred means to notify a contact person, especially by means of a switched-on answering machine/voice mailbox even when the person is not available, that personal information about the caller or about a third person to whom the message refers has changed, for example, the address, a phone number, an e-mail address or other contact information. The phone system can also consist of a network for Internet-based telephony (IP telephony). Here, if applicable, such contact information can also be valid for a limited period of time, for example, in the case of absence due to a vacation, a business trip, appointments and the like.

The invention makes use of the fact that messages sent via telecommunication networks contain a large amount of personal information that can be evaluated and further utilized. Thus, when personal information such as, for instance, a change of address, is found in a message, this information can then be extracted from the message, after which it has to be ascertained which person is to be associated with this found information, in order to then generate a database entry for this person with the information found, or else, if applicable, to change an existing database entry.

This provides the possibility to build up and maintain or update a database of a large size within a short period of time, for instance, by constantly querying and checking messages in telecommunication networks.

According to the invention, it can be provided that all kinds of messages are checked and evaluated whereby, for example, voice, text and video messages (e.g. still images, video images, e.g. streaming video) and websites can all be used here. Prior to checking a message for the presence of personal information, it can be necessary, for instance, to convert such a message into a format that can be evaluated or checked insofar as the message is not already in such a format, which is the case, for instance, with e-mails or text messages in the cellular network. This format can be, for example, a text format, for instance, with ASCII characters, since text information is essentially very easy to check and evaluate.

For messages that are not originally already in such a format, according to the invention, first a conversion can be carried out. For instance, voice messages, especially those that are left in voice mailboxes, can be converted into a format that can be evaluated such as, for example, text, following a speech analysis. Such conversions can also be provided, for instance, for fax messages or for any other messages that are not originally present in a format that can be evaluated.

Basically, it can be provided that a message that travels through a telecommunication network on its way from the sender to the recipient can be checked for the presence of personal information. In this context, according to the invention, it is immaterial at what point in time or at what stage of the passage through a telecommunication network such a checking procedure takes place.

In a preferred embodiment, however, it is provided that messages are checked which are stored within a telecommunication network, especially temporarily, and/or in a receiving telecommunication device, particularly a telecommunication terminal. Such storage, optionally even only temporarily, allows existent stored messages to be checked in a manner that is not time-critical, that is to say, a message traveling through the telecommunication network does not necessarily have to be analyzed at the moment when it is passing through the telecommunication network, which, in case of a high volume of messages, would place a severe strain on the network or on any infrastructures that are provided for such a checking procedure such as, for instance, computer systems.

The checking of messages that are stored optionally even only temporarily entails the advantage that the work needed to check messages can be spread out over time.

Generally speaking, the possibility also exists of fundamentally not checking every single message, but rather, for instance, only the messages contained in special memory units or memory areas within the telecommunication network or in telecommunication devices.

For instance, for data-protection reasons, it can be provided that a checking procedure is performed only for those messages for which the user in question, i.e. for example, the sender of such messages, has authorized such a checking procedure. Optionally, it can also be provided that an authorization has to be given by the appertaining recipients of the messages or else by both parties, in other words, by the receiving party as well as by the sending party.

According to the invention, it can be provided to check, for example, those messages that are stored, e.g. temporarily, especially in an exchange. Here, the term "exchange" does not necessarily refer to the exchange of a telephone network, but rather fundamentally to any exchange within a telecommunication network that ensures that a message is forwarded from a sender to a certain selected recipient.

Thus, a provision can be made for the intermediate storage of messages, optionally also in several exchanges of one or more telecommunication networks on their way from the sender to the recipient such as, for instance, when fax messages or e-mail messages are sent.

By the same token, the possibility also exists to check messages and to extract relevant information as soon the messages are stored in a receiving telecommunication device, especially in a telecommunication terminal such as, for example, a mailbox or an answering machine. Such a memory unit in which the messages accumulate and can be stored can already be provided, for instance, within a telecommunication network or optionally at the premises of a customer who operates a telecommunication terminal.

Likewise important for the method according to the invention is the fact that the personal information obtained from a message can be associated with a person so as to ensure that a database entry associated with this person can be generated or, if applicable, changed. In this context, it has proven to be advantageous if the personal information is associated with a person on the basis of the message itself and/or on the basis of data that is linked to such a message during the telecommunication such as, for instance, a communication data record.

Thus, for example, it is advantageous if the personal information is associated, for instance, on the basis of an analysis of the content of the message and/or of an identity of the telecommunication device that is sending or receiving the message such as, for example, on the basis of a call line identity (CLI), home location register (HLR), IMEI, SIM and/or on the basis of the identity of the person sending or receiving the message, for example, a PIN, PAN, SIM or, if applicable, biometric data and/or on the basis of key data, especially keywords or key images, in a message and/or other database information of a database edited according to the invention, or else any other database or on the basis of link addresses or communication addresses, particularly those that appear in a message.

An important aspect for the above-mentioned approaches according to the invention is that a message containing personal information is normally associated with additional data about a person to whom the above-mentioned information refers and which can be obtained, for instance, from an analysis of the content of the message, for example, by means of knowledge management. Thus, for example, it can be provided that names are mentioned in a message such as, for example, the name of the person sending the message, or else the recipient is addressed directly by name. Optionally, it can also be the case that a sender mentions a third person by name during communication with the recipient.

Especially the fact that telecommunication identities—such as, for example, the identity of the sending telecommunication connection or of the device connected thereto as well as, for instance, the identity of a receiving telecommunication connection or device—are associated with a message in a telecommunication network can be instrumental in identifying and creating an association with a person to whom the transmitted information refers.

Additional information can be obtained from the device identities or else, for instance, from the SIM cards of cell phones since normally these SIM cards are contractually associated with a certain person.

According to the invention and to one of the above-mentioned options that can be employed alternatively or cumulatively, it can also be provided that it is not only a message that is checked and evaluated, but also the biometric data that might be associated with the message so as to allow an association with a person. In the case of speech information, for example, such biometric data can be the transmitted speech data.

Especially in the case of key information such as, for instance, keywords, a simplified association can be achieved or at least facilitated. Such key information or keywords can be, for example, the mention of names or the naming of telephone numbers or typical identities in telecommunication networks such as e-mail addresses, Internet sites, etc.

In conjunction with other database information from a database operated according to the invention or from other databases, an attempt can also be made to allow or facilitate the association with a person, for example, in that a procedure checks in other databases or in the database according to the invention whether additional information matching the information found in the specifically checked message can be found that allows a correlation of the information concretely found in the checked message with the other information from the same database or from another database.

According to the invention, it can be provided that a database that is generated or maintained or updated by means of the method according to the invention is associated with at least one telecommunication participant and/or a telecommunication identity, especially with a memory unit operated by or under this telecommunication identity such as, for example, a mailbox.

As a result, it can be achieved according to the invention that, for example, the user of a telecommunication network who operates a telecommunication device within the network under a telecommunication identity that has been assigned to him/her can also operate a database to store the contact data about other persons that is important for this user. Such a database can be, for instance, a typical address database or appointment database.

Therefore, according to the invention, it can be provided, for example, that messages sent via the telecommunication network can optionally be stored in this network temporarily or permanently, then evaluated so as to generate, augment or maintain, that is to say, update, a database specifically associated with a given telecommunication participant.

For example, in this case it can be provided that, in order to generate or update this particular database, only those messages are used that are directed to this specific user or to his/her telecommunication identity or to a mailbox operated under that identity. In this manner, it can be ensured that any message that reaches this telecommunication participant via a telecommunication network and that contains information of a personal type about one of his/her contact persons according to the address database or appointment database is automatically evaluated so that the database associated with this person can be generated, augmented or corrected.

Thus, for instance, the address and contact database of a telecommunication participant can be automatically corrected if the owner of this database receives the message that one of the stored contact persons now has new or changed information, for instance, a different phone number. Following an evaluation, this information can be directly integrated into the database so that the owner of this database automatically receives the new contact information without having to personally evaluate the received message and to transfer the information into the database.

Telecommunication participants may be any participants who take part in a telecommunication in a direct or indirect manner.

Alternatively or cumulatively, the possibility also exists that a database of the type according to the invention is associated not only specifically with one telecommunication participant or with one telecommunication identity, but rather, it is available globally within a telecommunication network. Such a database can be, for instance, a generally accessible information database such as, for example, a telephone directory database or a business directory database.

Hence, it can be provided according to the invention that messages encompassing personal information about a person stored in such a database are automatically checked and utilized for purposes of changing, checking or updating the database entry pertaining to this person. To this end, the telecommunication network can be, for example, systematically scanned.

According to the invention, it can also be provided that, when several databases are operated that are associated, for instance, with various telecommunication participants or else that are available globally or on a broader basis, then the information pertaining to a certain reference person that is obtained from a message is automatically distributed among all of the databases that contain information about this reference person. Accordingly, the acquired information can be automatically distributed whereby, for example, it is first checked whether a given database contains information about the reference person and, if this is the case, then this information stored in the database is updated or augmented, optionally preceded by a plausibility check, particularly for purposes of verifying the information.

Especially with reference to the above-mentioned possibilities, it can be provided according to the invention that a database that is generated or maintained according to the invention, is then operated, for instance, in a centralized manner, especially within a telecommunication network, and/or in a decentralized manner, especially in a telecommunication device, for example, in a telecommunication terminal and/or in a server. Thus, such a database can be operated especially in a decentralized manner in a telecommunication terminal or at least in a telecommunication device assigned to a user or in a server located in a telecommunication network, provided that these databases are associated with persons.

According to the invention, it can also be alternatively or cumulatively provided that a database that is generated or maintained by the method according to the invention, especially, for example, a decentralized database, is merged with another database, particularly a centralized database.

This can also be done, for instance, upon request by a telecommunication participant, especially by the telecommunication participant to whom an above-mentioned decentralized database has been assigned.

Thus, the possibility exists, for example, for the user of a cell phone to update the address database or appointment database that is stored in his/her cell phone and to merge it with the information kept in a database generated according to the invention, for example, within a telecommunication network, either specifically for the user or else globally. For this purpose, it can be provided, for instance, that the telecommunication participant presses a special key on his/her cell phone or, for example, requests an update by means of, for instance, a text message addressed to his/her network provider.

By virtue of the fundamental possibilities of merging various databases with each other, the option also exists according to the invention to merge a database of a telecommunication network operator with a database of another telecommunication network operator. Thus, it is known that various telecommunication network operators such as, for instance, cellular network operators, operate their own databases, for example, with information about their customers. In order to make this information available among a plurality of networks, it can be provided according to the invention to carry out a corresponding data merge among a plurality of networks.

The method according to the invention also entails special advantages to the effect that, for example, when a telecommunication is established between a first and a second telecommunication participant, a database query can be made either automatically or else upon request to ascertain whether alternative or additional contact information about the second selected telecommunication participant is available.

In this manner, for example, a telecommunication participant who would like to communicate with a second telecommunication participant does not have to be concerned about whether he/she has the current communication identity such as, for instance, a telephone number. After all, he/she makes use of the telecommunication identity associated with a person and normally stored in his/her database, whereby then, either automatically or upon specific request, for instance, on the part of the sending telecommunication participant, a query of the database according to the invention is made in order to ascertain whether, in the meantime, the database has been updated within the scope of the method according to the invention so that then, if applicable, the selected network identity is automatically replaced by the now current network identity.

Thus, for instance, the selected telecommunication identity can be automatically forwarded to a telecommunication identity stored in the database. According to the invention, it can be provided that this preferred latter option is only carried out if the desired telecommunication partner cannot be reached under the telecommunication identity that was called first.

According to the invention, it can also be provided that information stored in a database is forwarded to registered users or user groups. In order to do so, for example, a distribution list can be associated with a database, said distribution list specifying to whom the information stored in the database will be distributed either automatically or upon request. In one application, this can comprise, for example, mail order companies or official agencies that have an interest in keeping their address data and, if applicable, customer data, up to date. Thus, for instance, it can be provided that a database operated by means of the method according to the invention is offered by a service provider and interested users or user groups can acquire contact data from said database, for instance, by purchasing said data.

According to a preferred embodiment of the invention, it can be provided, for instance, that a central data change service is made available within the network to which a telecommunication participant transmits a message of any type, for example, a voice text or an image message, whereby then the personal information stored in the message is extracted from the message and distributed to interested third parties or third-party services whereby, if applicable, it can be provided that the sender of such a message can optionally indicate in the message or in a predefined distribution list to whom the change information is to be transmitted. Thus, for instance, by means of the method according to the invention, it can be achieved that, if a person changes his/her address because of a move, the new contact data is automatically distributed, for instance, to all third parties with whom this person maintains contact.

The method described above can preferably also be executed in parallel to a telecommunication that is taking place, whereby the telecommunicated data constitutes the messages as defined by the invention.

BRIEF DESCRIPTION OF THE DRAWING

The present invention is elaborated upon below based on exemplary embodiments with reference to the drawing.

The FIGURE shows a flowchart depicting how the method according to the invention can be executed.

DETAILED DESCRIPTION

Referring to flowchart of the FIGURE, in step 1, it can be provided, for example, that a customer A calls a customer B, whereby then a communication data record is automatically generated during the establishment of this telecommunication and it encompasses the call line identity of the telephone connection of customer A (CLI(A)), calls—or else the home location register of customer A (HLR(A)) if he/she is using a cellular phone—as well as the called telecommunication identity, that is to say, the call line identity of customer B (CLI(B)). If, for instance, customer B is not available, in step 2 the voice mailbox, for example, within the telecommunication network, can receive and especially store a message left by customer A.

According to the invention, in step 3 it can then be provided that the stored message of step 2, which can be, for instance, a voice message, is then converted into text, for example, within the scope of speech recognition, after which the converted message can be analyzed, for instance, with reference to the transmitted communication identities, in order to associate the personal information found in the message with a corresponding person. Once this has been done, the appropriate personal information in the database can be updated or else can be generated for the first time. The current data may be sent and/or merged.

In step 4, the changes made in the database are distributed in accordance with a stored distribution list to other databases where the same person to whom the personal information refers is stored. In step 5, third-party subscribers receive the changes in the database and can thus make use of them. Therefore, in step 6, the changes are then also available in the internal databases of the third parties.

An example also serves to demonstrate how sent information can be evaluated and associated. The example below is, for instance, a voice message that, prior to be being checked and evaluated, undergoes a conversion, for example, into text.

Thus, for instance, caller Thomas can inform his friend George that he now has a new phone number as follows: "Hello George, this is Thomas, my new phone number is 12345."

Along with this phone number, the call line identity of Thomas's new telecommunication connection is transmitted—but it is not yet stored in George's database since it is a new connection. Moreover, in the communication data record, the call line identity is also transmitted to George, who is the party who has been called, so that here, by means of the method according to the invention, it can be checked in a database assigned to George whether contact information pertaining to someone named Thomas exists in the database.

Once the information in the message and the names "George" and "Thomas" extracted in this process have been evaluated—whereby the software recognizes that the typical "hello" proceeding the name George indicates that he is the person being addressed, especially in conjunction with the fact that the telecommunication identity of George was ascertained in the communication data record—it becomes clear that Thomas is the reference person.

Therefore, an unambiguous association can be assumed, at least if there is not more than one person named Thomas stored in George's database, so that now the contact data, that is to say, the new phone number for this person, can be stored in the database. Accordingly, George's address database was automatically updated with Thomas's new phone number as a result of the transmission of the message.

Due to the fact that, according to the above-mentioned part of the invention, an association with a person can take place on the basis of a wide variety of measures such as, for instance, checking the call line identity of the HLR, of the SIM, of the IMEI, of biometric data, etc., within the scope of the method according to the invention, it can be ascertained with a high degree of probability with which person the personal information ascertained in a message has to be associated.

If the option of making an association does not entail a sufficient level of probability, then it can also be provided according to the invention that, prior to the integration of the data, that is to say, prior to updating the database, a query is made to the owner of the database. Then, prior to the integration of the information that is meant to be integrated, this information can be offered or displayed to the database owner, so that the person in question can once again check the plausibility and then either confirm or reject the integration of the information.

What is claimed is:

1. A method for operating a database containing personal information, the method comprising:
    checking, for a presence of personal information, a content of a message sent, by a user via a telecommunication network; and
    when the personal information is found in the checking:
        extracting the personal information from the message;
        associating the extracted personal information with at least one person; and
        then storing the extracted personal information in a database,
        wherein the associating is performed based at least in part on at least one of:
            an identity of a telecommunication device that is sending or receiving the message; and
            an identity of a person sending or receiving the message.

2. The method as recited in claim 1 wherein the storing is performed so as to generate the database.

3. The method as recited in claim 1 wherein the database includes at least one of an address database and an appointment database.

4. The method as recited in claim 1 wherein the message includes at least one of a voice, a text message, an image message, a video message and a message in a website.

5. The method as recited in claim 1 further comprising storing the message at least one of within the telecommunication network and in a receiving telecommunication terminal.

6. The method as recited in claim 5 wherein the storing the message is performed so as to store the message temporarily.

7. The method as recited in claim 1 wherein the associating is performed at least in part based on at least one of:
   an analysis of the content of the message;
   key data;
   database information from the database or from another database;
   a link addresses; and
   a communication address.

8. The method as recited in claim 1 wherein the associating is performed based at least in part on the identity of the telecommunication device and the identity of the telecommunication device includes at least one of a CLI, an HLR, an IP address, an IMEI, and a SIM.

9. The method as recited in claim 1 wherein the associating is performed based at least in part on the identity of the person sending or receiving the message and the identity of the person sending or receiving the message includes at least one of a password, a PIN, a PAN, a SIM, and biometric data.

10. The method as recited in claim 7 wherein the associating is performed based at least in part on the key data and the key data includes at least one of a keyword and a key image.

11. The method as recited in claim 1 further comprising associating the database with at least one of a telecommunication participant and a telecommunication identity.

12. The method as recited in claim 11 wherein the associating the database is performed so as to associate the database with a memory unit operated by or under the telecommunication identity.

13. The method as, recited in 12 wherein the memory unit includes a mailbox.

14. The method as recited in claim 1 wherein the storing is performed in a centralized manner.

15. The method as recited in claim 14 wherein the database is a database within a telecommunication network.

16. The method as recited in claim 1 wherein the storing is performed in a decentralized manner.

17. The method as recited in claim 16 wherein the storing is performed so as to store the extracted information in at least one of a telecommunication device and a server.

18. The method as recited in claim 1 further comprising merging the database with another database.

19. The method as recited in claim 18 wherein the database includes a decentralized database.

20. The method as recited in claim 18 wherein the another database includes a centralized database.

21. The method as recited in claim 18 wherein the merging is performed upon request of a telecommunication participant.

22. The method as recited in claim 18 wherein the database is a database of a telecommunication network operator, and the another database is a database of another telecommunication network operator.

23. The method as recited in claim 1 further comprising, when a telecommunication is established between a first and a second telecommunication participant, querying the database either automatically or else upon request so as to determine whether alternative or additional contact information of the personal information is available about the second selected telecommunication participant.

24. The method as recited in claim 23 wherein the querying is performed so as to automatically forward a selected telecommunication identity to a telecommunication identity stored in the database.

25. The method as recited in claim 1 further comprising forwarding the stored personal information to registered users or user groups.

26. The method as recited in claim 1 wherein the checking is performed during a telecommunication between two participants.

27. The method as recited in claim 1 wherein the message includes a voice message and the personal information is extracted from the voice message by converting the voice message into text via speech recognition and extracting the personal information from the text.

28. The method as recited in claim 1 wherein the message includes an image and the personal information is extracted from the image.

29. The method as recited in claim 1 wherein the associating is performed based at least in part on the identity of the telecommunication device that is sending or receiving the message.

30. The method as recited in claim 1 wherein the associating is performed based at least in part on the identity of the person sending or receiving the message.

31. A method for operating a database containing personal information, the method comprising:
   checking, for a presence of personal information, a content of a message sent by a user via a telecommunication network; and
   when the personal information is found in the checking:
      extracting the personal information from the message;
      associating the extracted personal information with at least one person; and
      then storing the extracted personal information in a first database,
      wherein the associating is performed based at least in part on at least one of:
         key data included in the message;
         a link addresses included in the message; and
         a communication address included in the message.

32. The method as recited in claim 31 wherein the associating is performed based at least in part on the key data included in the message.

33. The method as recited in claim 31 wherein the associating is performed based at least in part on the link addresses included in the message.

34. The method as recited in claim 31 wherein the associating is performed based at least in part on the communication address included in the message.

35. The method as recited in claim 31 wherein the associating is performed based at least in part on database information from a second database.

* * * * *